ACRYLONITRILE EXTRACTION PROCESS

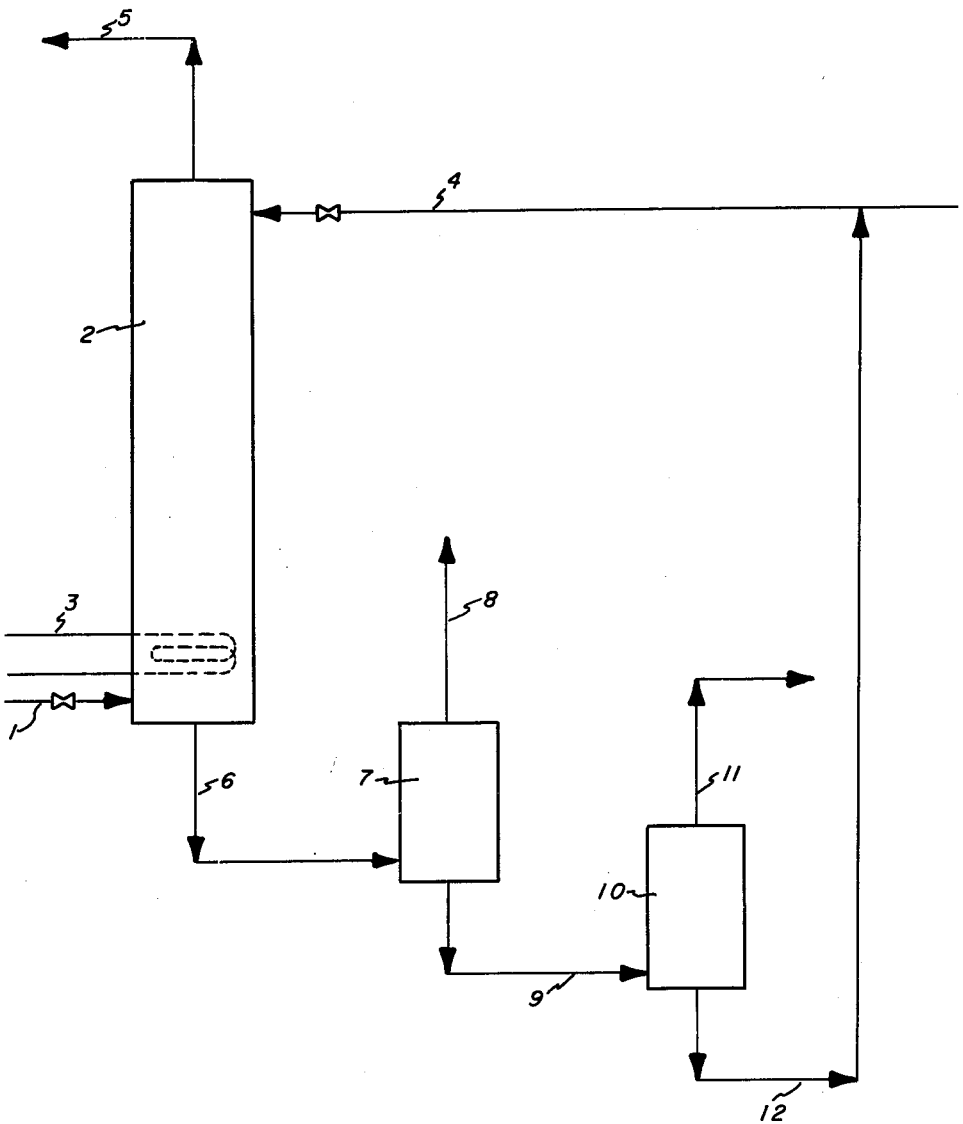

William G. Johnson, Woodbury, N.J., assignor to E. I. du Pont de Nemours and Company, Wilmington, Del., a corporation of Delaware Filed Dec. 29, 1958, Ser. No. 783,453

3 Claims. (Cl. 260—465.9)

The present invention relates to a process for treating the product stream from a reactor in which acrylonitrile is synthesized. More particularly, this invention relates to a process for treating the product stream so as to recover acrylonitrile and to provide a recycle gas stream.

In carrying out the manufacture of acrylonitrile by the reaction of nitric oxide and propylene in the presence of a dehydrogenation catalyst as disclosed in U.S. Patent 2,736,739, maximum yields and conversions are obtained when a large excess of propylene is used in the process. Economic considerations make desirable the use of the commercially available propylene which contains about 15% by volume of propane as the hydrocarbon feed, and the use of the product stream from an ammonia oxidation unit which contains about 15% by volume of nitric oxide, the remainder being primarily nitrogen, as the nitric oxide feed. The off-gas from the acrylonitrile synthesis thus contains, in addition to acrylonitrile, all of the nitrogen, all of the propane, and the unreacted portion of the propylene in the original feed.

Simple removal of the acrylonitrile and discard of the remainder of the off-gas is not economically feasible in view of the high content of propylene remaining in the off-gas. Alternatively, direct recycle of the gas stream after the removal of the acrylonitrile is not feasible either because of the increased proportion of nitrogen and propane such recycle would introduce to the system. Obviously, the most desirable recycle stream would be one containing only propylene and propane in essentially the same proportions as in the original hydrocarbon feed. Thus, a procedure is needed to remove the acrylonitrile, the nitrogen, and a portion of the propane from the reactor off-gas.

The acrylonitrile can be removed from the off-gas by simply cooling to condense the acrylonitrile, or the nitrogen can easily be separated from the off-gas by absorbing the propane, propylene, and acrlyonitrile in a suitable solvent.

Removal of a portion of the propane from the off-gas without simultaneous removal of propylene, however, is a more complex matter. The removal of a portion of the propane from the off-gas by ordinary fractional distillation is exceedingly difficult and highly impractical because of the closely similar vapor pressures of propane and propylene. However, a vapor-liquid phase separation of propylene from propane is possible by extractive distillation of the mixture in the presence of a relatively higher-boiling selective solvent which will increase the spread in the vapor pressures, and thus in relative volatilities of the propylene and propane. The vapor fraction will be enriched in the component showing the less deviation from Raoult's law of ideal solutions, and the bottoms or liquid fraction will consist of the added solvent enriched in the component showing the greater deviation from Raoult's law.

The effectiveness of a separation by extractive distillation is dependent on the proper choice of solvent. The solvent to be added must not form an azeotrope with any of the components to be separated, and it must have a higher boiling point than nitrogen, propane, or propylene. The solvent must have a different effect upon the partial pressures of propane and propylene in solution.

To fulfill the present requirements, the extractive distillation solvent must permit the desired degree of separation of propane from the acrylonitrile reactor off-gas, must absorb essentially all the acrylonitrile present, and must permit the separation of essentially all the nitrogen.

Accordingly, it is an object of the present invention to provide a method for reducing the propane content in an acrylonitrile reactor off-gas containing propane, propylene, nitrogen, and acrlyonitrile. It is another object of this invention to recover essentially all of the acrylonitrile from an acrylonitrile reactor off-gas containing propane, propylene, nitrogen, and acrylonitrile. It is a further object of this invention to provide a method for the separation of essentially all the nitrogen from an acrylonitrile reactor off-gas containing propane, propylene, nitrogen, and acrylonitrile. It is a still further object of this invention to provide a method wherein the reduction of the propane content, recovery of the acrylonitrile, and separation of the nitrogen from an acrylonitrile reactor off-gas containing propane, propylene, nitrogen, and acrylonitrile are carried out simultaneously. Other objects will become apparent as the invention is more fully described.

I have found that the foregoing objects are achieved when I introduce an acrylonitrile reactor off-gas containing propane, propylene, nitrogen, and acrylonitrile into the lower portion of a rectification tower and introduce benzonitrile into the upper portion of the tower to permit the benzonitrile to contact the propane-propylene-nitrogen-acrylonitrile stream in countercurrent relationship, the quantities of ingredients and the conditions of operation being such that essentially all of the nitrogen and a portion of the propane will be withdrawn as vapor.

A flow diagram for a process using the solvent of this invention is shown in Figure 1. The drawing is illustrative only and not to be construed as limiting the invention in any way.

Referring now specifically to Figure 1, off-gas from the acrylonitrile reactor comprising propane, propylene nitrogen, and acrylonitrile enters through line 1 to rectification tower 2 which is equipped with cooling coil 3. Solvent is introduced near the top of tower 2 through line 4 and descends down through tower 2. Tower 2 contains trays, sieve plates, bubble-cap plates, or packing, to a height corresponding to a number of theoretical plates as calculated by a method well-known in the art, e.g., heat and material balances on each plate, corrected by the empirically determined plate efficiency. Vapor enriched in propane and containing essentially all of the nitrogen is removed overhead through line 5. A liquid fraction comprising the solvent containing essentially all of the acrylonitrile, the propylene, and the propane not removed as vapor is withdrawn from tower 2 through line 6 and introduced into column 7 where the propylene and propane are flashed from the solvent. The propylene and propane are recovered through line 8 and recycled to the acrylonitrile reactor. The propane- and propylene-free solvent containing acrylonitrile is withdrawn from column 7 through line 9 and introduced into distillation column 10 where the acrylonitrile is fractionally distilled from the solvent. The acrylonitrile is removed from column 10 through line 11 and sent to a refiner. The solvent is discharged from column 10 through line 12 and recycled to rectification tower 2.

The following examples illustrate a method of carrying out the process of the present invention. The examples are descriptive only and are not intended to limit the invention in any manner.

Example 1

An off-gas stream from the acrylonitrile reactor is fed at an hourly rate of 1341 moles of propylene, 269 moles of propane, 1821 moles of nitrogen, and 184 moles of acrylonitrile and at a temperature of 40° C. and a pressure of 9127 mm. of mercury to the bottom of a rectification tower. The overall composition of the stream by volume thus is about 37% of propylene, 7% of propane, 51% of nitrogen, and 5% of acrylonitrile, and propane makes up 16.7% by volume of the propane-propylene content. Benzonitrile is fed to the top of the tower at a temperature of 24° C. and at an hourly rate of 6728 moles. The benzonitrile and the acrylonitrile reactor off-gas are maintained at a temperature of 36° C. at the bottom of the tower to prevent too-rapid boil-up by means of a cooling coil. The pressure at the bottom of the tower is 9127 mm. of mercury. The vapor removed overhead from the tower per hour comprises 1821 moles of nitrogen, 33 moles of propane, and 3 moles of propylene. The liquid bottoms removed from the tower per hour comprises 6728 moles of benzonitrile, 184 moles of acrylonitrile, 1338 moles of propylene, and 236 moles of propane. Thus, the propylene-to-propane mole ratio in the benzonitrile solution is 85 to 15. The propane and propylene are flashed from the liquid fraction to give a propane-propylene stream containing 15% by volume of propane which is recycled to the acrylonitrile reactor. Acrylonitrile is recovered from the benzonitrile solution by fractional distillation and the benzonitrile is recycled to the rectification tower.

Example 2

An acrylonitrile reactor off-gas having the same composition as that given in Example 1 is fed at a temperature of 40° C., a pressure of 9127 mm. of mercury, and at a rate of 1341 moles of propylene, 269 moles of propane, 184 moles of acrylonitrile, and 1821 moles of nitrogen per hour to the bottom of a rectification tower. Benzonitrile is fed to the top of the tower at a temperature of −10.7° C. and at a rate of 3364 moles per hour. The benzonitrile and the acrylonitrile reactor off-gas at the bottom of the tower are maintained at a temperature of 16° C. by a cooling coil to prevent too-rapid boil-up. The pressure at the bottom of the tower is 9127 mm. of mercury. Vapor removed from the top of the tower per hour consists of 33 moles of propane, 3 moles of propylene, and 1821 moles of nitrogen per hour. A liquid fraction is withdrawn from the bottom of the tower at an hourly rate of 3364 moles of benzonitrile, 184 moles of acrylonitrile, 1338 moles of propylene, and 236 moles of propane. The propane and propylene are flashed from the bottoms to give a propane-propylene stream containing 15% by volume of propane. The acrylonitrile is fractionally distilled from the propane-propylene-free benzonitrile, and the benzonitrile is recycled to the rectification tower.

Very small amounts of solvent are included in the tower overhead; however, in the process of the present invention, these quantities are negligible and have not been reported.

The examples show the separation of all of the nitrogen and a portion of the propane and the recovery of all of the acrylonitrile from an acrylonitrile reactor off-gas containing about 37% by volume of propylene, 7% by volume of propane, 5% by volume of acrylonitrile, and 51% by volume of nitrogen to obtain a gas stream containing 85% by volume of propylene and 15% by volume of propane which is suitable for recycle to the acrylonitrile reactor.

As is obvious to one skilled in the art, the separation of propane and propylene is dependent on several interrelated factors; the height of the tower, rate of feed of the acrylonitrile reactor off-gas, rate of feed of the benzonitrile, temperatures of the acrylonitrile reactor off-gas and the benzonitrile feed, temperature of the tower, the pressure within the tower, and the pressure drop per plate within the tower; and a propane-propylene mixture of any desired composition may be obtained via the process of the present invention by judicious adjustment of these factors. For instance, the proportion of propane separated from a propane-propylene-nitrogen-acrylonitrile mixture may be increased by increasing the rate of feed of benzonitrile relative to the rate of feed of the gas stream and/or increasing the height of the tower.

In Examples 1 and 2, the mole ratio of propylene to propane in the feed gas to the acrylonitrile reactor was 85 to 15, and this ratio was obtained from a reactor off-gas in which the ratio was 83.3 to 16.7. If the same feed-gas ratio is desired and the off-gas has a lesser or greater propylene-to-propane ratio, the rectification tower conditions can be altered by conventional means to compensate for such variance. On the other hand, a feed-gas having a different ratio of propylene to propane may be used. In such case, the tower and conditions will be designed to provide the desired rectification of the off-gas. Thus, I do not intend to be limited to the specific ranges illustrated in these examples.

The height of a rectification tower, generally termed "column height," is determined in part by the number of plates or by the height of the packing in the tower. Since the performance of plate-column equipment is recognized as more or less standard, the performance of other types of equipment, e.g., packed columns, is generally reduced to equivalent terms to facilitate comparison with plate columns. The number of plates, in turn, is determined by the number of theoretical plates required to effect the desired separation corrected by an empirically determined plate efficiency figure as mentioned earlier. The number of theoretical plates is primarily dependent on the nature of the feed, i.e., the difficulty of separation of the components to be separated and on the degree of separation desired, and on the nature of the separating agent. In addition, the column height, or number of plates, needed for a given degree of separation is directly related to the other design factors such as the rate of feed of the benzonitrile and the rate of feed of the stream containing the components to be separated. In Examples 1 and 2 a superatmospheric pressure of 9127 mm. of mercury was maintained at the bottom of the rectification tower but it will be appreciated that the process may be effected over a wide range of pressures by suitable adjustment of the temperatures, and conversely, a wide range of temperatures of operation may be used by employing corresponding pressures. These factors—column height, rates of feed of the ingredients, temperature, and pressure—are determined for the present process by methods well known to the art.

An added feature of the process of the present invention is that no heat need be supplied to the process because the heat of solution provides the heat required for distillation. This feature makes for economy of operation.

The nature and objects of the present invention have been completely described and illustrated in the foregoing disclosure. The invention is not limited to the exact details shown and described as obvious modifications will become apparent to those skilled in the art. Accordingly, I intend to be limited only by the following claims.

I claim:

1. A process for the elimination of substantially all the nitrogen and a substantial proportion of the propane content from an acrylonitrile reactor product gas consisting essentially of propane, propylene, acrylonitrile, and nitrogen which comprises introducing said propane-propylene-acrylonitrile-nitrogen stream near the bottom of a rectification tower maintained under superatmospheric pressure, introducing benzonitrile near the top of said tower, permitting the benzonitrile to contact the propane-propylene-acrylonitrile-nitrogen stream in countercurrent relationship, removing a gaseous fraction containing substantially all of the nitrogen and enriched in propane, and removing a liquid fraction comprising benzonitrile containing dissolved therein essentially all of the acrylonitrile, the propylene, and the remaining propane.

2. A process as in claim 1 wherein the propane and propylene dissolved in said benzonitrile are separated therefrom by flashing and said separated propane and propylene are recycled to the acrylonitrile reactor.

3. A process as in claim 1 wherein the acrylonitrile dissolved in said benzonitrile is separated therefrom by fractional distillation.

References Cited in the file of this patent

UNITED STATES PATENTS

| | | |
|---|---|---|
| 2,702,300 | Keller et al. | Feb. 15, 1955 |
| 2,736,739 | England et al. | Feb. 28, 1956 |
| 2,738,030 | Keller et al. | Mar. 13, 1956 |
| 2,773,088 | Maslan | Dec. 4, 1956 |
| 2,803,641 | Sandner et al. | Aug. 20, 1957 |
| 2,878,166 | Dunn | Mar. 17, 1959 |